US011969736B2

(12) United States Patent
Back

(10) Patent No.: US 11,969,736 B2
(45) Date of Patent: Apr. 30, 2024

(54) CROSS-SHAPED SUPPORT FOR A MEAT MINCING MACHINE

(71) Applicant: Lumbeck & Wolter GmbH & Co. KG, Wuppertal (DE)

(72) Inventor: Udo Back, Münnerstadt/Reichenbach (DE)

(73) Assignee: Lumbeck & Wolter GmbH & Co. KG, Wuppertal (DE)

( * ) Notice: Subject to any disclaimer, the term of this patent is extended or adjusted under 35 U.S.C. 154(b) by 0 days.

(21) Appl. No.: 18/245,444

(22) PCT Filed: Nov. 4, 2021

(86) PCT No.: PCT/EP2021/080606
§ 371 (c)(1),
(2) Date: Mar. 15, 2023

(87) PCT Pub. No.: WO2022/096556
PCT Pub. Date: May 12, 2022

(65) Prior Publication Data

US 2023/0381789 A1 Nov. 30, 2023

(30) Foreign Application Priority Data

Nov. 5, 2020 (DE) ..................... 20 2020 106 351.0

(51) Int. Cl.
*B02C 18/30* (2006.01)

(52) U.S. Cl.
CPC .......... *B02C 18/305* (2013.01); *B02C 18/302* (2013.01)

(58) Field of Classification Search
CPC ... B02C 18/2258; B02C 18/30; B02C 18/301; B02C 18/305
See application file for complete search history.

(56) References Cited

U.S. PATENT DOCUMENTS

| | | | | |
|---|---|---|---|---|
| 374,568 A * | 12/1887 | Woodruff | .............. | B02C 18/301 241/82.3 |
| 2,459,230 A * | 1/1949 | Litten | ................... | B02C 18/301 241/82.3 |

(Continued)

FOREIGN PATENT DOCUMENTS

| | | | |
|---|---|---|---|
| DE | 102007005214 B3 | 6/2008 | |
| DE | 202014104033 U1 | 10/2014 | |
| DE | 202016103109 U1 * | 9/2017 | ........... B02C 18/305 |

(Continued)

OTHER PUBLICATIONS

Annexes to the International Preliminary Report on Patentability (Chapter II) in PCT/EP2021/080606, dated Feb. 15, 2023.

(Continued)

*Primary Examiner* — Faye Francis
(74) *Attorney, Agent, or Firm* — Oppedahl Patent Law Firm LLC

(57) ABSTRACT

The invention relates to a cross-shaped support (10) for a meat-mincing machine. The cross-shaped support (10) has a hub (11) with a central bore (15), an outer ring (13), and multiple webs (12) which extend between the hub (11) and the outer ring (13). A groove (14) is provided on the exterior of the outer ring (13) in order to support the cross-shaped support (10) in the meat-mincing machine in a rotationally fixed manner. The cross-shaped support (10) additionally functions as a tool, for example the cross-shaped support has projections (16) which allow a simplification of the assembly or disassembly of the knife pin from the meat-mincing machine (FIG. 1).

8 Claims, 3 Drawing Sheets

(56) References Cited

U.S. PATENT DOCUMENTS

| | | | | |
|---|---|---|---|---|
| 3,340,917 A * | 9/1967 | Vedvik | B02C 18/301 241/86.2 |
| 6,449,991 B1 | 9/2002 | Hogan | |
| 7,946,517 B2 * | 5/2011 | Lesar | B02C 18/302 241/82.5 |
| 2007/0090218 A1 * | 4/2007 | Lesar | B02C 18/302 241/82.5 |
| 2009/0001202 A1 * | 1/2009 | Lesar | B02C 18/302 241/82.6 |
| 2015/0096341 A1 | 4/2015 | Overgaard | |
| 2015/0108260 A1 * | 4/2015 | Metcalf | B02C 18/302 241/78 |
| 2015/0196039 A1 * | 7/2015 | Wolff | A22C 17/0026 425/281 |
| 2016/0051990 A1 * | 2/2016 | Joechner | B02C 18/302 241/86.1 |
| 2016/0143484 A1 * | 5/2016 | Palmer | B02C 18/305 241/82.1 |
| 2016/0236202 A1 * | 8/2016 | Leonardi | B02C 18/301 |
| 2022/0088611 A1 * | 3/2022 | Lind | B02C 18/305 |

FOREIGN PATENT DOCUMENTS

| | | | |
|---|---|---|---|
| DE | 102018202563 A1 | 8/2019 | |
| DE | 202020105051 U1 | 10/2020 | |
| DE | 202020105052 U1 | 10/2020 | |
| DE | 202020106351 U1 | 12/2020 | |
| EP | 0467428 A1 | 1/1992 | |
| EP | 0813944 A2 * | 12/1997 | B02C 18/2258 |
| EP | 1908898 A1 | 4/2008 | |
| KR | 102147343 B1 | 8/2020 | |

OTHER PUBLICATIONS

International Preliminary Report on Patentability (Chapter II) in PCT/EP2021/080606, dated Feb. 15, 2023.

International Preliminary Report on Patentability Chapter II in PCT application No. PCT/EP2021/075329, Feb. 23, 2022.

* cited by examiner

CROSS-SHAPED SUPPORT FOR A MEAT MINCING MACHINE

The invention relates to a cross-shaped support for a meat grinder.

In the case of meat grinders, a multi-part cutting set is generally used, with the material to be ground thrust via an augur through a plurality of grinding steps, for example by means of a pre-cutter, and one or more knives and perforated discs, so that the material is ground to the desired degree. The last element of such a cutting set generally forms a cross-shaped support. In the grinding process, the knives are mounted on a drivable rotatable blade journal, so that they rotate together with the blade journal. For this purpose, they have a central shaped recess adapted to the cross-section of the blade journal. The pre-cutter, the perforated discs, and the cross-shaped support, on the other hand, are arranged in a rotationally fixed manner in the housing of the meat grinder, and have a central bore for the blade journal.

Figure 4:
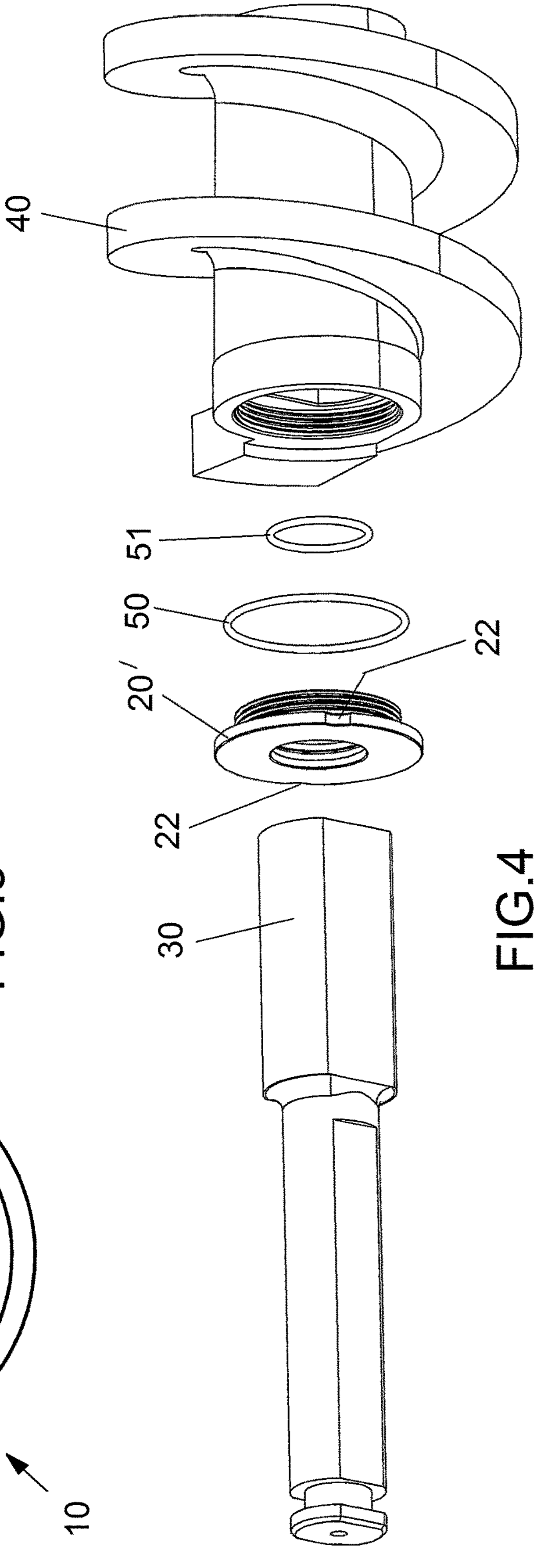

Known meat grinders according to the utility model DE202010105051.6 or DE202010105052.4 show the blade journal with one end in a rotationally fixed manner with the augur and have, starting from the connection point with the augur, an axially extending support section on which the knives are mounted. During assembly, the blade journal is inserted with its one end, the insertion end, into the bearing bore of the augur. A fastening ring, which is pushed onto the blade journal and bears against the stop surface of the blade journal, is then connected to the augur. This assembly is designed so that it can be disassembled. In the disassembly of the blade journal, recesses 21, see FIG. 2, or notches 22, see FIG. 4, are provided on the fastening ring in order to facilitate the release of the screw connection; in the prior art, a suitable tool is needed to bring about a release of the screw connection.

The object of the present invention was to simplify the assembly or disassembly of the known blade journals.

This object is achieved by means of a cross-shaped support for meat grinders having the features of claim 1. Advantageous embodiments are described in the dependent claims.

For a meat grinder, a new-shaped support is proposed which, in a known manner, comprises a hub with a central bore, an outer ring and a plurality of webs which extend between the hub and the outer ring. A groove is provided on the outer side of the outer ring for the purpose of rotationally fixed mounting of the cross-shaped support in the meat grinder. In addition, this cross-shaped support has a tool function. Thus, one or more elements which have a tool function are present in the region of the hub, the outer ring or the webs.

In one embodiment, such elements are provided on an end face of the hub. These elements can serve as engagement elements, for example in the disassembly of the blade journal. For example, noses project from the end face of the hub, that is from the front or rear face of the cross-shaped support. The arrangement of the noses is essential in this case. After removal of the cutting elements from the meat grinder, the fastening ring must be released for disassembly of the blade journal described above. The invention thus relates to a method for the release of the fastening ring holding the blade journal in place the augur. For this purpose, the cross-shaped support is pushed onto the blade journal and rotated in such a way that the noses present on the cross-shaped support are aligned with corresponding recesses or notches of the fastening ring. The cross-shaped support is pressed against the fastening ring, and the noses engage in the recesses or notches of the fastening ring. The fastening ring can then be released by rotating the cross-shaped support.

In a known manner, the new cross-shaped support braces the elements of the cutting set in the housing of the meat grinder together with a locking nut. In addition, the new cross-shaped support has an additional function, namely a tool function. In one embodiment of the invention, it can serve as an assembly or disassembly tool for the blade journal. In an advantageous manner, no additional tool is required for the assembly and disassembly of the blade journal. In further embodiments, a the cross-shaped support has additional tool functions.

Figure 1:
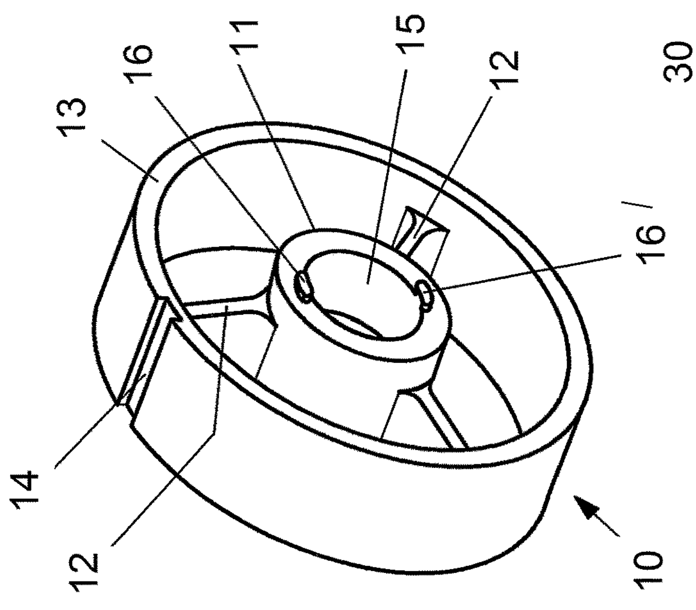
Figure 2:
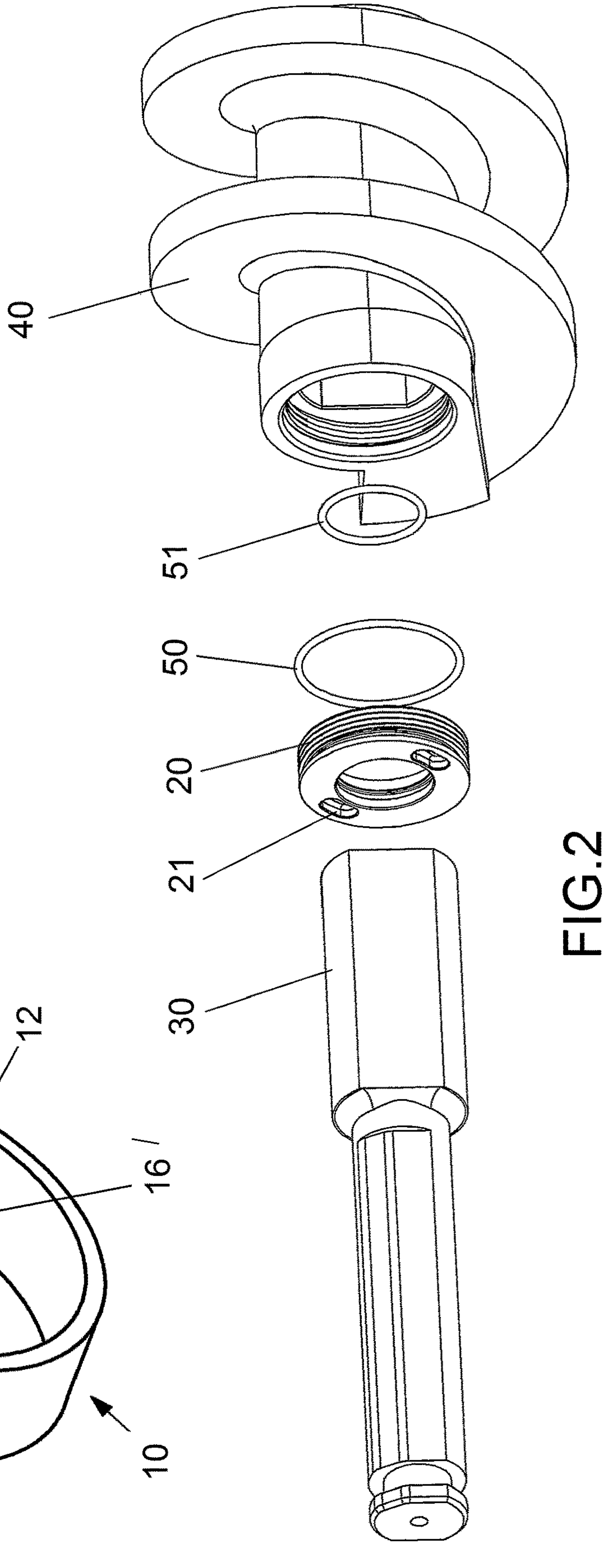
Figure 3:
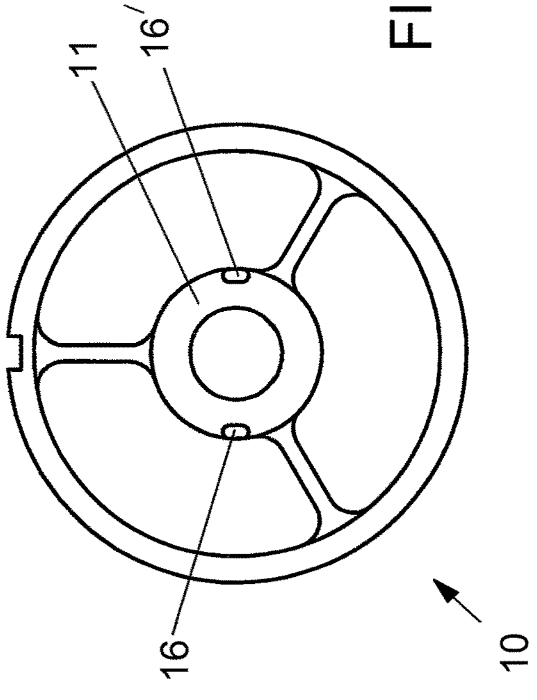
Figure 6:
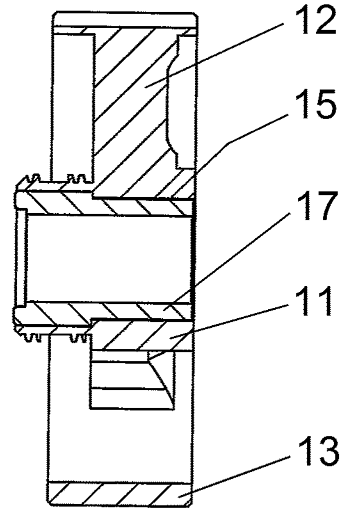
Figure 5:
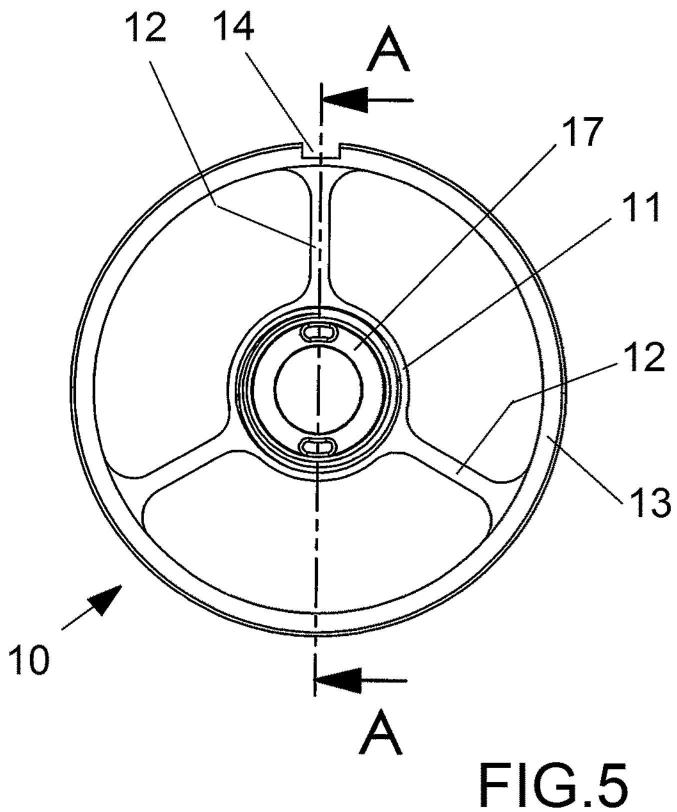
Figure 7:
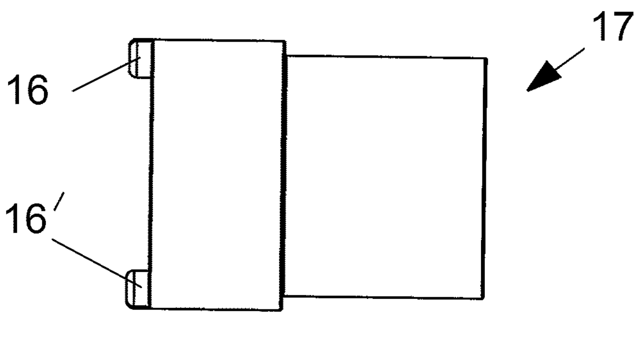
Figure 8:
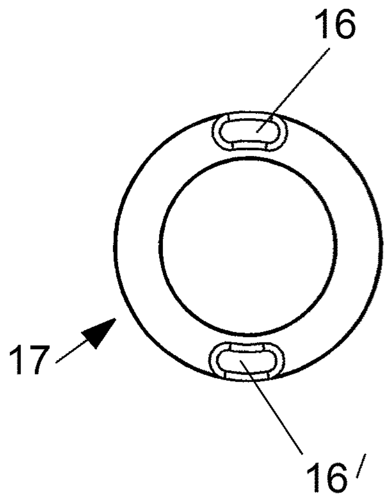

The invention is explained in more detail below on the basis of three exemplary embodiments with reference to the drawing, in which:

FIG. 1 shows a perspective view of a cross-shaped support according to the invention, FIG. 2 shows a known blade journal prior to assembly, FIG. 3 shows a perspective view of a further cross-shaped support, FIG. 4 shows a further known blade journal prior to assembly, FIG. 5 shows a front side of a further cross-shaped support according to the invention, FIG. 6 is a sectional view of the cross-shaped support according to FIG. 5, FIG. 7 shows a side view of a bearing bushing, and FIG. 8 shows a front side of a bearing bushing.

The cross-shaped support 10 shown in the figures is the last element of a cutting set in the meat grinder. In FIG. 1, this cross-shaped support 10 has three webs 12 which connect an outer ring 13 and a central hub 11. A central bore 15 is provided in the hub 11. In this central bore 15, the blade journal 30, shown in FIG. 2, can be received in a rotationally movable manner. In this example, the hub 11 has two noses 16, 16' on its end face. For the rotationally fixed mounting of the cross-shaped support 10 in the meat grinder, there is provided on the outer ring 13 a groove 14 which cooperates with a corresponding adjusting spring on the housing wall of the meat grinder and thus prevents rotational movement of the cross-shaped support 10 during the grinding process. To assemble and disassemble the elements of the cutting set, the adjusting spring is removed and a rotational movement of the cross-shaped support is possible.

FIG. 2 shows the augur 40, the blade journal 30 and the fastening ring 20 used for connecting the blade journal 30 to the augur 40. In addition, two sealing rings 50, 51 are provided in this exemplary embodiment. One end of the blade journal 30 is inserted into the augur 40. A fastening ring 20, which has a matching thread for a screw connection to the augur 40, is pushed over the blade journal 30. Subsequently, the cross-shaped support 10 is also pushed over the narrower part of the blade journal 30 and the cross-shaped support 10 is aligned in such a way that the two noses 16, 16' can engage in the two recesses 21. If the cross-shaped support 10 is pressed tightly against the fastening ring 20, a rotational movement of the cross-shaped support 10 can be carried out. For this purpose, the webs 12 of the cross-shaped support provide a handle. The rotational movement of the cross-shaped support 10 is transmitted by the engagement of the noses 16, 16' into the recesses 21 on the fastening ring 20 and thus the screw connection to the augur 40 is tightened. Removal of the blade journal 30 likewise takes place with the aid of the cross-shaped support 10. Therefore, it is not necessary to provide a separate tool to achieve this removal.

In a further embodiment of the cross-shaped support 10, shown in FIG. 3, two noses 16, 16' are likewise present diametrically opposite on the end face of the hub 11. In this case, the noses 16, 16' are located on the outer edge of the hub 11. This arrangement has been selected so that the noses 16, 16' can engage in edge-side notches 22 of the fastening ring 20', shown in FIG. 4. The mounting and removal process of the blade journal 30 with the aid of the cross-shaped support 10 from FIG. 3 takes place as described in the preceding example.

In a third embodiment of the cross-shaped support 10, shown in FIG. 5 and FIG. 6, the cross-shaped support 10 has a bearing bushing 17 positioned in the central bore 15. Such bearing bushings 17 are used in the case of cross-shaped supports and cutting elements of the meat grinder so that, after a certain period of operation, it is only necessary to replace the bearing bushing and not the entirety of the cross-shaped support or cutting set element. In this embodiment of the cross-shaped support 10, the two noses 16, 16' are located diametrically opposite on the front side of the bearing bushing 17. In the side view of the bearing bushing 17, FIG. 7 clearly shows that the noses 16, 16' protrude from the front side. Here too, the noses 16, 16' are provided on the outer edge of the bearing bushing 17; see FIG. 8. The bearing bushing 17 has an inner bore in which the blade journal 30, shown in FIG. 2, can be accommodated in a rotationally movable manner.

The bearing bushing 17 has a front region (left side of FIG. 7) of larger outer diameter, and a rear region (right side of FIG. 7) with a smaller outer diameter. Suitably, the hub 11 of the cross-shaped support 10 has a central bore 15 with two regions, each of which has a different inner diameter, so that a step is formed. The mounting and removal process of the blade journal 30 with the aid of this cross-shaped support 10 from FIG. 5 takes place as already described. In this case, the step in the interior of the hub 11 prevents the bearing bushing 17 from pressing backwards through the central bore 15 during the assembly or removal process. It forms a stop region for the front region of the bearing bushing 17.

In another embodiment of the bearing bushing, the front region of larger outer diameter is likewise designed as a ring, but the rear region has a shape deviating from the round ring has, for example, a circumferential shape which is oval in cross-section.

For other application examples, elements with a tool function are not merely provided in the region of the hub 11, but also on the webs 12 or the outer ring 13.

LIST OF REFERENCE SIGNS

10 Cross-shaped support
11 Hub
12 Webs
13 Outer ring
14 Groove
15 Central bore
16, 16' noses
17 Bearing bushing
20 Fastening ring
21 Recess
22 Notch
30 Blade journal
40 Auger
50, 51 Sealing rings

The invention claimed is:

1. A cross-shaped support for use with a meat grinder comprising a fastening ring (20, 20') having one or more recesses (21) or having one or more grooves (22), the cross-shaped support comprising a hub (11) with a central bore (15), an outer ring (13) and a plurality of webs (12) which extend between the hub (11) and the outer ring (13), the cross-shaped support having a groove (14) on the outside of the outer ring (13) for non-rotatable mounting in the meat grinder, wherein in the area of the hub (11) there are one or more protruding noses (16, 16') that engage with the one or more recesses or the one or more grooves, thereby defining a tool function, the one or more protruding noses (16, 16') being arranged on an end face of the hub (11), which one or more protruding noses (16, 16') project away from the end face of the hub (11), or the one or more protruding noses (16, 16') being arranged on a front side of a bearing bushing (17) held in the central bore (15) of the hub (11), the one or more noses 16, 16') protruding away from the front side of the bearing bushing (17).

2. The cross-shaped support according to claim 1, wherein the one or more noses (16, 16') comprise two noses (16, 16'), and wherein the two noses (16, 16') are arranged diametrically opposite one another on the end face of the hub (11).

3. The cross-shaped support according to claim 1, wherein the one or more protruding noses (16, 16') are located on an outer edge of the hub (11) or the bearing bushing (17).

4. The cross-shaped support according to claim 1, wherein the bearing bushing (17) has two areas of differing outside diameters, namely a front area and a rear area, the front area having a larger outside diameter than the rear area, the central bore (15) of the hub (11) having an area with an inner diameter sized to fit the larger outside diameter of the front area of the bearing bushing (17).

5. The cross-shaped support according to claim 1, wherein the rear area of the bearing bushing (17) is non-round in shape.

6. The cross-shaped support according to claim 2, wherein the one or more protruding noses (16, 16') are located on an outer edge of the hub (11) or the bearing bushing (17).

7. The cross-shaped support according to claim 5, wherein the non-round shape of the rear region of the bearing bushing (17) comprises an oval cross-section perimeter.

8. The cross-shaped support according to claim 1, wherein the one or more noses (16, 16') comprise two noses (16, 16'), and wherein the two noses (16, 16') are arranged diametrically opposite one another on the front side of the bearing bushing (17).

* * * * *